United States Patent
Beerwerth et al.

[11] Patent Number: 6,149,297
[45] Date of Patent: Nov. 21, 2000

[54] INFRARED RADIATION THERMOMETER

[75] Inventors: Frank Beerwerth, Runkel-Ennerich; Albrecht Jestädt, Friedrichsdorf; Heinz Bültges, Eppstein, all of Germany

[73] Assignee: Braun GmbH, Kronberg, Germany

[21] Appl. No.: 09/068,840

[22] PCT Filed: Nov. 12, 1996

[86] PCT No.: PCT/EP96/04933

§ 371 Date: May 18, 1998

§ 102(e) Date: May 18, 1998

[87] PCT Pub. No.: WO97/19332

PCT Pub. Date: May 29, 1997

[30] Foreign Application Priority Data

Nov. 18, 1995 [DE] Germany ............... 195 43 096

[51] Int. Cl.⁷ .................. G01K 1/08; G01J 5/02; G08B 5/00; G08B 21/00; G08B 3/10
[52] U.S. Cl. .......... 374/121; 374/158; 374/209; 374/130; 340/541; 340/815.4; 340/584
[58] Field of Search .................. 374/121, 180, 374/158, 209; 340/541, 815.4, 584, 589, 686.1, 687, 686.4; 128/664, 736

[56] References Cited

U.S. PATENT DOCUMENTS

| | | | |
|---|---|---|---|
| 5,169,235 | 12/1992 | Tominaga et al. | 374/121 |
| 5,340,215 | 8/1994 | Makita et al. | 374/121 |
| 5,411,032 | 5/1995 | Essett et al. | 374/121 |
| 5,487,607 | 1/1996 | Makita et al. | 374/209 |

FOREIGN PATENT DOCUMENTS

| | | |
|---|---|---|
| 0024717 | 3/1981 | European Pat. Off. |
| 0445784 | 9/1991 | European Pat. Off. |
| 0472490 | 2/1992 | European Pat. Off. |
| 0502277 | 9/1992 | European Pat. Off. |
| 0565123 | 10/1993 | European Pat. Off. |
| 0445784 | 5/1997 | European Pat. Off. |
| 9500067 | 1/1995 | WIPO |

*Primary Examiner*—G. Bradley Bennett
*Assistant Examiner*—G. Verbitsky
*Attorney, Agent, or Firm*—Hopgood, Calimafde, Kalil & Judlowe

[57] ABSTRACT

The invention is directed to a method of operating a tympanic thermometer, in which a sensor (8) for detecting infrared radiation is arranged in a housing (1) having a radiation inlet (23). Associated with the sensor (8) is an electronic evaluation unit (13). For temperature measurement, the radiation inlet (23) is covered with a probe cover (5) transparent to infrared radiation. The condition of a missing probe cover (5) is indicated by an audible warning signal or a signal lamp (14) which are activated after the thermometer is turned on.

18 Claims, 1 Drawing Sheet

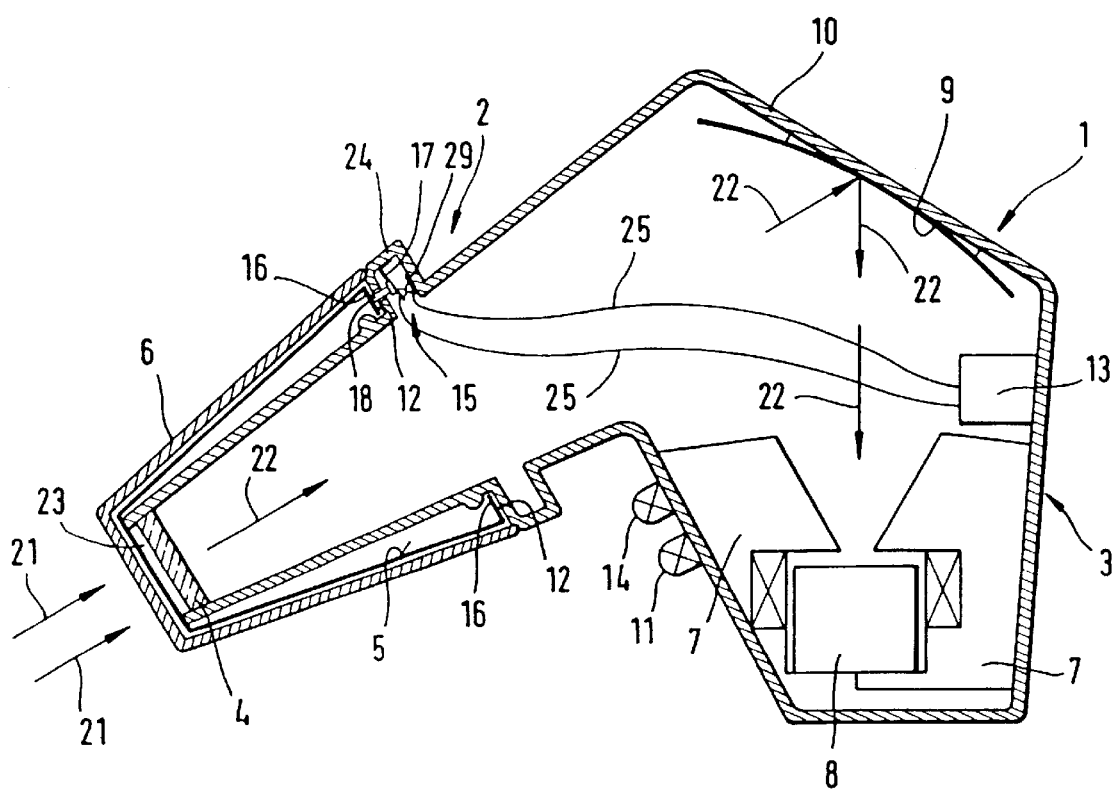

INFRARED RADIATION THERMOMETER

BACKGROUND OF THE INVENTION

1. Field of the Invention

This invention relates to an infrared radiation thermometer, in particular a tympanic thermometer, in which a sensor detecting infrared radiation and having an electronic evaluation circuitry associated therewith is arranged in a housing having a radiation inlet, in which for temperature measurement the radiation inlet is covered with a detachable probe cover sufficiently transparent to infrared radiation, and in which the absence of a probe cover is detected by a sensor issuing a warning signal after the thermometer is switched on.

2. The State of the Art

Infrared radiation thermometers of the type initially referred to are used for measuring body temperature in both a domestic and a medical environment. Typically, such a radiation thermometer includes a housing with a window admitting radiation, an optical waveguide or an optical power collecting arrangement, and an infrared sensor which is connected to an electronic evaluation unit. The IR window serves the function of closing off the interior of the housing of the radiation thermometer, thereby protecting the optical components and the infrared sensor from contamination and irreparable damage.

In order to prevent in particular the transmission of diseases due to failure to maintain sanitary conditions, it has become common practice to fit a probe cover over the IR window which comprises a window section fixedly connected to the infrared optic system, thus preventing the entry of contaminants. This enables ready replacement of the probe cover which is advantageously a deep-drawn component transmitting infrared radiation well and having a very thin area for the passage of light as, for example, in the form of a film or a film-type section.

In order to prevent the measurements referred to in the foregoing from being performed without a probe cover installed, known tympanic thermometers have been equipped with an evaluation unit detecting, for example, the absence of a probe cover and indicating such absence on an indicating device. Thus, for example, an infrared radiation thermometer is known from EP-A-0 565 123 in which a measurement without the probe cover installed cannot be performed.

SUMMARY OF THE INVENTION

Proceeding from the prior art described, it is an object of the present invention to indicate an infrared radiation thermometer of the type initially referred to, which alerts an operator to an impending faulty operation of the instrument prior to its use.

DESCRIPTION OF PREFERRED EMBODIMENTS

On the basis of the infrared radiation thermometer initially described, this object is accomplished by the features of the invention. If no probe cover is mounted on the thermometer, the temperature is still measured, but in conjunction with the issuance of a warning signal indicating the need to clean the instrument. In this manner, an operator is made aware of the fact that the infrared thermometer was previously used either without a probe cover or with a used probe cover and that it needs to be cleaned before further measurements are taken. The user is thereby informed of the risk of erroneous readings due to potentially contaminated optical components or reuse of a used probe cover, however, this requires the instrument to have detected that the measurement lies within the range of the body temperature which is only possible if the radiation inlet is introduced into an ear canal.

By means of a switching device actuated by the probe cover, the instrument detects whether or not a probe cover was installed during this measurement, and if so, it checks during the next measurement whether the switching device was again actuated by a replaced probe cover. If it is established that the switching device was not actuated again during the second measurement, the instrument knows that the probe cover was not replaced, hence that the previously used probe cover is to be used again. If the switching device is not actuated at all, the instrument knows that no probe cover was fitted over it. In either event, the first and, following the measurement, the second warning signal will be issued.

According to the features of the invention, a warning signal is to be issued also when a previously used probe cover is about to be used for another measurement. With this approach, the user is reminded to replace a previously used probe cover in order to thus prevent the potential transmission of diseases. Accordingly, when the sensor is actuated by a probe cover, a measurement is subsequently taken and later another measurement is performed without the sensor having received another pulse, a warning signal is generated to inform the user that the probe cover is used twice. The prerequisite for the issuance of a warning signal is that the temperature lie within the range of the human body temperature during temperature measurement. By applying this condition, any other measurements lying outside this temperature range will not give rise to a warning signal because it is then assumed that these readings are taken, for example, on the patient's skin or other body surfaces where the risk of contaminating the radiation inlet or the probe cover is not present as a rule. The temperature range which is between 36.5 and 37.5° C. can only be measured in a cavity of the human body, in particular in the ear canal. Any other temperature measurements taken on the surface of the human body are below this temperature range.

After an erroneous reading has occurred, first the radiation inlet has to be cleaned, and a probe cover has to be installed and introduced into the ear again in order to perform a test measurement. If this test measurement turns out positive, that is, the radiation inlet is found to be perfectly sanitary, further measurements may be taken again. This test cycle is repeated on each measurement performed without the probe cover installed.

For a perfect measurement to be performed, either a healthy person having no elevated temperature or a calibrating device (black body) are required for the test measurement. It is then necessary for the measurement to lie within a prior known temperature range, preferably between 36 and 37.5° C. If the temperature to be measured and the measured temperature are outside this range, the instrument is not cleared for operation, remaining in the test mode.

According to the features of the invention, the warning signal activates an indicating device indicating to the user that the radiation inlet needs to be cleaned.

According to the features of the invention, the output of the indicating device is a signal lamp or an audible signal. The warning may also be given in the form of a red lamp with suitable lettering in front of it.

According to the features of the invention, those measurements that give rise to the issuance of the warning signal are not indicated on the indicating device. The benefit of this is that an operator, the next time after the warning signal is issued, will not even attempt to introduce the radiation inlet into the ear because no temperature will be indicated in the first place.

By virtue of the features of the invention, once the warning signal is issued a further temperature measurement is possible only by express actuation of an additional switching device. An operator thus knows that he or she should have cleaned the instrument or substituted a new probe cover. This arrangement has the added advantage of enabling further temperature readings to be taken in cases where, for example, no probe covers are currently available and a patient's temperature has risen to a critical level.

According to the features of the invention, a further warning signal is released by the sensor signal when a missing probe cover is detected. This warning signal is invariably given when the absence of a probe cover is established. It is invariably given at a time preceding the warning signal issued after the temperature measurement is initiated. These two signals accordingly warn an operator both before and after the measurement of an improper operation.

The features of the invention are provided to allow the user sufficient time for installation of a probe cover on the instrument after the thermometer is switched on, or for substitution of a new probe cover for a used probe cover prior to using the clinical thermometer. This approach involves the release of a warning signal not until after a predetermined, where applicable, adjustable delay interval. For this purpose, delay intervals from three to five seconds, for example, are sufficient. If the absence of a probe cover continues to be established upon the expiration of such a delay interval, the warning signal will tell the user that a probe cover should be fitted to the clinical thermometer. If a probe cover is installed after the warning signal is produced, the warning signal will cease subsequently.

With the features of the invention, provision is made for the data to be saved in the evaluation unit after the instrument is switched off, and for this data to be available for further evaluation the next time the instrument is switched on. This means that when the instrument is turned off after a temperature reading has been taken, without however replacing the probe cover, the further warning signal indicative of the need to replace the probe cover will be released the next time the instrument is activated. Failure to replace the probe cover produces upon temperature measurement a warning signal indicative of the need to clean the radiation inlet or to replace the probe cover, but this occurs only if the temperature is within the range of human body temperature.

The probe cover may be, for example, a thin disposable film made of polyethylene transparent to infrared radiation.

The temperature measuring instrument may be configured such that a probe cover is mountable on the radiation inlet, upon which probe cover a protective cap is placed. In such an arrangement, the probe cover is a disposable cover needing to be replaced prior to each temperature measurement, while the outer protective cap is a sheath that is seated on the instrument to guard the optical components during periods of non use. The protective cap is significantly thicker than the probe cover, that is, the protective cap is capable of withstanding shocks without the risk of damage to the optical components.

An embodiment of the present invention will be described in the following with reference to the sole FIG. 1 of the accompanying drawing.

The infrared radiation thermometer as illustrated in the drawing has an angled housing 1 with a forward housing section 2 and a rear housing section 3. The forward housing section 2 which tapers conically in the direction of a radiation inlet 23 has on its radiation inlet 23 a window 4 that is covered with a probe cover 5 for measurement. The rear area of the probe cover 5 is dimensioned such as to be suitable for insertion in a person's ear canal (not shown) for taking a temperature reading without exerting a high pressure on the ear—and this in both an adult's or a child's ear canal. The probe cover 5 is a thin polyethylene film extending in particular over the window 4 and being transparent to infrared radiation for taking a person's temperature.

For storage of the thermometer, it is possible either to place a protective cap 6 onto the probe cover 5 as shown in the Figure, or to place directly on the housing section 2 (not shown) a protective cap 6 (without probe cover) which has a small spacing to the probe cover in its interior to avoid contamination. However, it can also be considered to store the instrument with just the probe cover 5 mounted.

Held in mounts 7, an infrared sensor 8 is arranged in the rear housing section 3. To direct the radiation passing through the window 4 into the interior of the housing 1 to the infrared sensor 8, a reflective device 9 is secured to a rear housing wall 10. The infrared sensor 8 is preferably configured as a pyroelectric sensor. In a further embodiment, the infrared sensor 8 is configured as a thermopile sensor.

The infrared window 4 is selected such that infrared radiation identified by arrows 22 enters the housing 1 in the wave-length range relevant for the temperature. At room temperature, this range is between 5 $\mu$m and 15 $\mu$m. Such a window 4 is manufactured from a sheet of polyethylene, for example. In this arrangement, the probe 5 serves as protective film for the window 4, being fitted prior to each temperature measurement and removed again subsequent to each measurement to prevent a used probe cover 5 from being used again by another person. The probe cover 5 maintains the area of the forward housing section 2 of the infrared thermometer in a sanitary condition.

To achieve temperature measurement precision it is important for the instrument to be usuable only in combination with the probe cover 5 covering the window 4. The probe cover 5 which covers the window 4 or, in the event of no window 4 existing, closes off the interior of the housing 1, serves to protect the corresponding optical components from contamination. Contamination may be attributable to dust, dirt or the effect of humidity on the one hand, and ear wax on the other hand. By invariably substituting a net probe cover 5 for a used probe cover 5, another person does not have to introduce a contaminated probe cover 5 into his or her ear canal. As becomes apparent from the Figure, the probe cover 5 is readily replaceable by being pulled off the forward housing section 2 and substituting a new probe cover 5. The robe cover 5 is designed to be a disposable item, a new one being used for each temperature measurement.

To allow the user sufficient time for installation of a probe cover 5 after the thermometer is switched on, or for substitution of a new probe cover 5 for a used probe cover 5 prior to using the clinical thermometer, the instrument is not ready for operation until after a predetermined period of time. This involves the release of a warning signal 14 not until after a predetermined, where applicable, adjustable delay interval if the instrument is to be used without a probe cover or with the same probe cover. For this purpose, delay intervals from three to five seconds, for example, are sufficient. If the absence of the probe cover 5 continues to be established upon the expiration of such a delay interval, the first warning signal 14 will be generated, telling the user that a probe cover 5 should be fitted over the IR window 4 or the forward housing section 2.

To prevent this tympanic thermometer from being used without the probe cover 5 installed, an annular stop 24 is provided on the forward housing section 2 for abutting engagement with an end section 12 of the probe cover 5. This annular stop 24 has an electric switching device 15 which on abutment of the probe cover 5 is closed by the probe cover's annular collar 16, whereby an electric signal is generated which is supplied via leads 25 to an evaluation unit 13, not shown in greater detail, which is electrically connected to the infrared sensor 8. The switching device 15 has its one contact tab 17 connected to a slidable tappet 18 which is displaced by the annular collar 16 when the probe cover 5 is installed and connects the contact tab 17 to the contact tab 29, that is, short-circuits the switching device 15 to thereby produce an electric signal by means of which neither the signal lamp 14 nor an audible signal (not shown) is released. The switching device 15 is preferably a microswitch. It will be understood, however, that a magnetic switch or a further optical sensor may be substituted producing equally an electric signal when the probe cover 5 is mounted. According to the present invention, the warning signal is a visual or audible signal, for example, a light-emitting diode 14 as shown in the Figure, or a piezoelectric buzzer (not shown).

The lamp is of such brightness that an operator will see it also when the sun shines, being thus alerted to the absence of a probe cover 5. Correspondingly, the same applies to the volume of the audible signal.

If no probe cover 5 is installed, the electric switching device 15 in this embodiment will not cause the electric signal for "probe cover installed" to be produced in the evaluation unit 13, as a result of which the lamp or light-emitting diode 14 lights up or flashes clearly. This informs an operator that no probe cover 5 is fitted over the housing section 2 or that the probe cover 5 is not in proper seating engagement with the forward cylindrical housing section 2, so that no proper temperature reading takes place. When the temperature value then determined is roughly within the range of human body temperature, a further warning signal 11 which is generated by the evaluation unit 13 and is, for example, also configured to be a light-emitting diode, will be issued. Accordingly, while the light-emitting diode 14 provides a general indication of a missing probe cover, the light-emitting diode 11 signals to the operator that a measurement was performed within the range of body temperature but without probe cover 5, providing, in addition to the information that the measured value is not correct, the information that the IR window 4 needs to be cleaned, in order to avoid that error is introduced in a subsequent temperature measurement taken with the probe cover 5, for example.

On the other hand, a warning signal 11 will be issued also if a sensible temperature value greater than 36.5° C., for example, was measured, but without using a new probe cover 5. In this case, the warning signal 11 indicates that the electric switching device 15 has not detected a replaced probe cover, and that hence sanitary conditions may be doubtful or erroneous readings may have occurred due to a contaminated probe cover.

In a further embodiment, the warning signal 11 indicating that a probe cover 5 has been used several times is issued by a third device. This third device is configured, for example, as a third light-emitting diode or a third type of signal, so that a distinction is possible from the warning signal 11 indicative of a temperature measurement within the range of body temperature with the probe cover 5 not installed.

In further aspects of this embodiment, the electric switching device 15 is coupled to the On/Off function of the infrared radiation thermometer, causing the instrument to turn itself on automatically as the protective cap 6 is removed. In this arrangement, the electric switching device 15 detects the presence of both the protective cap 6 and the probe cover 5.

Alternatively, a second embodiment makes provision for two sensors which operate independently of each other to detect the presence of the probe cover and the protective cap. In an advantageous further feature of this embodiment, the sensor or electric switching device (not illustrated in the Figure) for detecting the presence of the protective cap 6 is at the same time connected to an On/Off switch of the instrument, so that the instrument is turned on when the protective cap 6 is removed.

In a further aspect, an electrical connection is provided between the sensor for the protective cap 6 and the evaluation unit 13 by means of which the sensor delivers to the evaluation unit 13 an electric signal which after a predetermined interval activates a further warning signal to indicate an error condition on the radiation inlet (soiled), on the probe cover 5 (absent or used several times), or a missing protective cap 6. This is necessary to prevent the unprotected IR window 4 from contamination or damage during storage. Where separate sensors are provided for the protective cap 6 and the probe cover 5, different time intervals are set until a warning signal is released.

To detect whether the sensing portion of the infrared thermometer is introduced into the ear without a temperature measurement being initiated, a further embodiment makes provision for a power save mode enabling a temperature measurement to be automatically performed continually or at short intervals. If a temperature reading is then taken which is within the range of body temperature although no probe cover 5 is installed or a measurement within the range of body temperature was already performed with the probe cover installed, the evaluation unit 13 will generate a warning signal 11.

What is claimed is:

1. An infrared radiation tympanic thermometer with a housing (1) having a window (4) for admitting radiation, said window being adapted to be covered with a detachable probe cover (5) sufficiently transparent to infrared radiation, with an infrared sensor (8) arranged in the interior of the housing (1) and being associated with an electronic evaluation unit (13), said evaluation unit performing a temperature measurement each time it receives a start signal and the result being output on an indicating device, and with a further sensor (15) detecting the condition of the probe cover (5) as "installed" and "not installed" and delivering a corresponding signal to the evaluation unit (13), characterized in that said evaluation unit (13) generates a warning signal when, on a temperature measurement performed without a probe cover (5) installed, a temperature value is established that lies in the range of the human body temperature.

2. An infrared radiation tympanic thermometer with a housing (1) having a window (4) for admitting radiation, said window being adapted to be covered with a detachable probe cover (5) sufficiently transparent to infrared radiation, with an infrared sensor (8) arranged in the interior of the housing (1) and being associated with an electronic evaluation unit (13), said evaluation unit performing a temperature measurement each time it receives a start signal and the result being output on an indicating device, and with a further sensor (15) detecting the condition of the probe cover (5) as "installed" and "not installed" and delivering a corresponding signal to the evaluation unit (13), characterized in that said evaluation unit (13) generates a warning signal in the event that a first measurement yields a temperature value lying within the range of human body temperature and with the probe cover (5) continuing to be installed, a second start signal is released following which a temperature value lying within the same range is established.

3. The infrared radiation thermometer as claimed in claim 1, characterized in that the warning signal (11) activates an indicating device (11) indicative of the need to clean the IR window (4).

4. The infrared radiation thermometer as claimed in claim 3, characterized in that the indicating device (11) delivers a visual or audible signal.

5. The infrared radiation thermometer as claimed in claim 1, characterized in that those temperature measurements that give rise to the issuance of the warning signal are not output on the indicating device.

6. The infrared radiation thermometer as claimed in claim 1, characterized in that upon issuance of the warning signal a further measurement is only possible upon actuation of a particular switching device.

7. The infrared radiation thermometer as claimed in claim 1, characterized in that a further warning signal (14) is issued in the event of the further sensor (15) detecting the condition probe cover (5) as "not installed".

8. The infrared radiation thermometer as claimed in claim 4, characterized in that upon removal of a probe cover (5) the further warning signal (14) indicating the probe cover (5) as "not installed" is not released until after a delay interval sufficient to substitute a new probe cover (5).

9. The infrared radiation thermometer as claimed in claim 1, characterized in that upon turning off the instrument the signal issued by the further sensor (15) continues to be held in the evaluation unit (13) and is used for further evaluation after the instrument is turned on again.

10. The infrared radiation thermometer as claimed in claim 1, characterized in that it includes a protective cap (6) and a sensor detecting the conditions protective cap (6) as "installed" and "not installed" and delivering a corresponding signal to the evaluation unit (13).

11. The infrared radiation thermometer as claimed in claim 10, characterized in that the evaluation unit (13) activates the infrared radiation thermometer when the sensor detects a removed protective cap.

12. The infrared radiation thermometer as claimed in claim 2, characterized in that the warning signal (11) activates an indicating device (11) indicative of the need to clean the IR window (4).

13. The infrared radiation thermometer as claimed in claim 12, characterized in that the indicating device (11) delivers a visual or audible signal.

14. The infrared radiation thermometer as claimed in claim 2, characterized in that those temperature measurements that give rise to the issuance of the warning signal are not output on the indicating device.

15. The infrared radiation thermometer as claimed in claim 2, characterized in that upon issuance of the warning signal a further measurement is only possible upon actuation of a particular switching device.

16. The infrared radiation thermometer as claimed in claim 2, characterized in that a further warning signal (14) is issued in the event of the further sensor (15) detecting the condition probe cover (5) as "not installed".

17. The infrared radiation thermometer as claimed in claim 2, characterized in that upon turning off the instrument the signal issued by the further sensor (15) continues to be held in the evaluation unit (13) and is used for further evaluation after the instrument is turned on again.

18. The infrared radiation thermometer as claimed in claim 2, characterized in that it includes a protective cap (6) and a sensor detecting the condition of the protective cap (6) as "installed" and "not installed" and delivering a corresponding signal to the evaluation unit (13).

* * * * *